United States Patent
Eschbach et al.

(10) Patent No.: US 6,628,843 B1
(45) Date of Patent: Sep. 30, 2003

(54) IMAGE ENHANCEMENT ON JPEG COMPRESSED IMAGE DATA

(75) Inventors: Reiner Eschbach, Webster, NY (US); Keith T. Knox, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/448,947

(22) Filed: Nov. 24, 1999

(51) Int. Cl.[7] ................................................ G06K 9/40
(52) U.S. Cl. ...................................... 382/274; 358/461
(58) Field of Search .............................. 382/254, 274, 382/275; 348/251, 254, 606, 624; 358/1.9–3.31, 447, 461, 463; 250/205; 345/20, 63, 77, 581–615, 596–599, 690–697

(56) References Cited

U.S. PATENT DOCUMENTS

| | | | |
|---|---|---|---|
| 5,072,314 A | * 12/1991 | Chang | 359/559 |
| 5,115,468 A | * 5/1992 | Asahi et al. | 704/203 |
| 5,347,374 A | 9/1994 | Fuss et al. | |
| 5,357,352 A | 10/1994 | Eschbach | |
| 5,363,209 A | 11/1994 | Eschbach | |
| 5,371,615 A | 12/1994 | Eschbach | |
| 5,414,538 A | 5/1995 | Eschbach | |
| 5,450,217 A | 9/1995 | Eschbach | |
| 5,450,502 A | 9/1995 | Eschbach | |
| 5,521,642 A | 5/1996 | Park | |
| 5,724,456 A | 3/1998 | Boyack et al. | |
| 5,802,214 A | 9/1998 | Eschbach | |
| 5,912,702 A | * 6/1999 | Sudo | 348/234 |

FOREIGN PATENT DOCUMENTS

| | | |
|---|---|---|
| EP | 0 648 040 A2 | 4/1995 |
| EP | 0 794 511 A2 | 9/1997 |

OTHER PUBLICATIONS

"A Highly Efficient System for Automatic Face Region Detection in MPEG Video", Hualu Wang et al., IEEE Transactions on Circuits and Systems for Video Technology, vol. 7, No. 4, Aug., 1997.

Search Report dated Mar. 28, 2003, from Application No. 00125519.9–1522.

Statutory Invention Registration No. USH0001684: Fast preview processing for JPEG compressed images, de Queiroz and Eschbach, Oct. 7, 1997.

* cited by examiner

Primary Examiner—Samir Ahmed
(74) Attorney, Agent, or Firm—Fay, Sharpe, Fagan, Minnich & McKee, LLP

(57) ABSTRACT

A method and apparatus are provided for enhancing JPEG compressed digital image data wherein only the DC components of the compressed image data are required to obtain a statistical subsampling of the corresponding uncompressed image data. JPEG compressed image data are received that represent an input digital image, and the JPEG compressed image data include a plurality of DC components. DC components are extracted from the JPEG compressed image data, and the extracted plurality of said DC components represent a subsampling of the input digital image. At least some of the plurality of extracted DC components are input to an automated image enhancement system. The DC components input to the automated image enhancement system are used to derive at least one of a final correction tone reproduction curve and a sharpness filter for enhancement of the input digital image represented by the JPEG compressed data. The final correction tone reproduction curve and/or sharpness filter are bound to the JPEG compressed image data for subsequent use in enhancing the input digital image represented by the JPEG compressed image data after the JPEG compressed image data have been decompressed.

15 Claims, 3 Drawing Sheets

IMAGE ENHANCEMENT ON JPEG COMPRESSED IMAGE DATA

CROSS REFERENCE TO RELATED U.S. PATENTS

Cross reference is made to the following commonly assigned U.S. Patents to Eschbach et al., each of which is hereby expressly incorporated by reference herein: U.S. Pat. No. 5,414,538; U.S. Pat. No. 5,357,352; U.S. Pat. No. 5,450,502; U.S. Pat. No. 5,371,615; U.S. Pat. No. 5,363,209; U.S. Pat. No. 5,450,217; and, U.S. Pat. No. 5,802,214. Similarly, commonly assigned U.S. Pat. No. 5,347,374 to Fuss et al. is also hereby expressly incorporated by reference herein.

BACKGROUND OF THE INVENTION

In the past, a typical application for copiers or scan-to-print image processing systems was to reproduce an input image as accurately as possible, i.e., render a copy. Thus, copies have been rendered as accurately as possible, including flaws in the source image. However, as customers have become more sophisticated in their document reproduction requirements, they have recognized that an exact copy is often not desired. Instead, an inexact copy that is perceived as a higher quality image has been deemed more desirable.

Until recently, image quality from the output of a copier or a scan-to-print system was directly related to the quality of the input image. While this has been satisfactory for reproducing images of text or line drawings, it has been found to be sub-optimal for purposes of reproducing photographs and other more complex images. With photographs, in particular, reproduction is complicated given the inexact nature of the discipline, variations in equipment, aging of photographs, and the like. Given that the input image is often poor quality, it has been deemed desirable to render an output image that is perceived to be the "best" possible image (or at least superior to the input image), rather than an exact copy.

The above-noted patents to Eschbach et al. and Fuss et al. disclose an Automated Image Enhancement (AIE) system. This system receives an optionally sub-sampled description of the input image, and alters the tone reproduction curve (TRC)—a curve that defines the relationship of an input image signal to an output image signal for purposes of enhancement—and/or derives or alters a sharpness filter for that image on an image-by-image basis, as appropriate, so that the resulting output image is perceived to be superior to the input image. AIE is used, for example, to alter perceived exposure, luminance, sharpness, saturation, color balance, and the like to provide an output image that is preferable to the input image. It is important to note that AIE performs well even if it has to rely upon a sub-sampled image to statistically analyze the overall image. AIE does not require that each and every item of image information be analyzed. Of course, this sub-sampling speeds image enhancement operations and reduces the size/number of memory buffers required to implement the AIE system.

More particularly, for example, U.S. Pat. No. 5,414,538 entitled "Image-Dependent Exposure Enhancement" discloses a method of altering the perceived exposure of an output image produced from an input image that includes: (a) receiving the input image defined in terms of red-green-blue (RGB) signals; (b) converting the RGB signals to corresponding luminance-chrominance signals including at least one signal that represent overall image intensity; (c) comparing the intensity signal to upper and lower intensity threshold signals that define the acceptable levels of brightness and darkness in the image; (d) if one of the thresholds is exceeded, the image signal representative of image intensity is processed according to a select equation, and a TRC associated with the image is adjusted so that exposure characteristics of the resulting output image are perceived to be superior to those of the input image.

U.S. Pat. No. 5,450,502 entitled "Image-Dependent Luminance Enhancement" discloses a method of altering the perceived luminance of an output image produced from an input image that includes: (a) receiving the input image data defined in terms of a color space; (b) if required, converting the input image data into a luminance-chrominance color space wherein at least one term bears a relationship to overall intensity of the input image; (c) deriving a global intensity histogram for the overall input image; (d) filtering the histogram signal to flatten high peaks and low valleys without altering its relatively flat portions; and, (e) utilizing the filtered histogram signal to control TRC mapping in a device with which the image is to be rendered. In accordance with another aspect of the disclosed luminance enhancement method, the input image can be divided into plural regions, and a local intensity histogram signal can be derived for each region. If any of the local histogram signals are flatter than the global histogram signal, the local signals are summed and used in place of the global histogram as input to the histogram flattening filter.

The methods described in the Eschbach et al. '538 and '502 patents, and the other Eschbach et al. and Fuss et al. patents noted above, are described in connection with uncompressed image data. However, in many image processing operations, the image data is retrieved from an image storage device or other location or is otherwise supplied in a compressed form to minimize image storage space. Most commonly, the image data is compressed according to the Joint Photographic Expert Group (JPEG) recommendation ISO DIS 10918-1 that has become an international standard for lossy compression of still images.

Thus, heretofore, image enhancement operations according to the AIE systems described above have required that the JPEG (or otherwise) compressed images first be decompressed or "decoded" for image enhancement operations. This is undesirable in that the decompression operation slows the overall enhancement operation, the image processing apparatus must be provided with additional memory to accommodate large amounts of uncompressed image data, and each JPEG or other lossy compression operation, itself, further degrades the image data due to data loss.

In light of the foregoing, it has been deemed desirable to provide a novel and non-obvious method for utilizing JPEG compressed image data in the image enhancement operations described in the above-noted Eschbach et al. and Fuss et al. AIE patents. This will allow JPEG compressed images to be enhanced for subsequent rendering without the image being decompressed, enhanced, and then recompressed.

SUMMARY OF THE INVENTION

In accordance with the present invention, a method and apparatus for image enhancement of JPEG compressed image data are provided.

In accordance with a first aspect of the present invention, a method of processing JPEG compressed image data comprises: (i) receiving JPEG compressed image data that represent an input digital image, the JPEG compressed image data including a plurality of DC components; (ii)

extracting a plurality of the DC components from the JPEG compressed image data; (iii) inputting at least some of the extracted DC components to an automated image enhancement system; (iv) using the DC components input to the automated image enhancement system to derive a final correction tone reproduction curve and/or a sharpness filter for enhancement of the input digital image represented by the JPEG compressed data; (v) decompressing the JPEG compressed image data to obtain decompressed image data that represent the input digital image; and, (vi) using the final tone reproduction curve and/or the sharpness filter to enhance the decompressed image data.

In accordance with another aspect of the present invention, an apparatus for processing JPEG compressed image data is provided. The apparatus includes means for receiving JPEG compressed image data that represent an input digital image; a DC component extractor adapted for extracting a plurality of the DC components from the JPEG compressed image data; an automated image enhancement system adapted for receiving some or all of the extracted DC components and for using same to derive a final correction tone reproduction curve and/or a sharpness filter for enhancement of the input digital image represented by said JPEG compressed data; means for decompressing the JPEG compressed data to provide uncompressed image data that represent the input digital image; and, means for using the final tone reproduction curve and/or the sharpness filter to enhance the uncompressed image data provided by the decompressing means.

In accordance with still another aspect of the present invention, a method of subsampling JPEG compressed image data in an automated image enhancement system includes: (i) receiving blocks of JPEG compressed image data, wherein each of the blocks represents a plurality of pixels of an input digital image and includes a DC component; (ii) without altering the JPEG compressed data, extracting the DC components from at least some of the blocks of JPEG compressed data; (iii) inputting at least some of the extracted DC components to an automated image enhancement system; and, (iv) using the DC components input to the automated image enhancement system to generate a correction tone reproduction curve and/or a sharpness filter that are to be applied to the input digital image represented by the JPEG compressed data after the JPEG compressed data are decompressed.

One advantage of the present invention resides in the provision of a method and apparatus for enhancing JPEG compressed image data, without fully decompressing the data.

Another advantage of the present invention is found in the provision of a method for enhancing JPEG compressed data in terms of exposure, luminance, sharpness, and otherwise utilizing only the DC components of JPEG compressed data.

Still another advantage of the present invention is the provision of a method for enhancing JPEG compressed image data wherein use of the JPEG DC components only for image enhancement operations necessarily sub-samples the image data according to the JPEG data blocks so that the image is sub-sampled by a factor of at least 64 for black-and-white data and by a factor of at least 192 for color data.

A further advantage of the present invention is the provision of a method for enhancing JPEG compressed image data that minimizes image data loss due to repetitive JPEG compression and decompression operations.

Still another advantage of the present invention resides in the provision of a method for enhancing JPEG compressed image data that is usable in image processing apparatus that are not able to store a full decompressed digital image due to memory constraints.

Yet another advantage of the present invention is found in the provision of a method for enhancing JPEG compressed digital images that have been scanned previously without image enhancement processing and stored in JPEG compressed in a data base.

A still further advantage of the present invention resides in the provision of a method and apparatus for enhancing JPEG compressed digital images wherein the enhancement TRC and/or filter can be bound to the JPEG compressed data for subsequent use when decompression of the JPEG compressed data is otherwise required.

Still other benefits and advantages of the present invention will become apparent to those of ordinary skill in the art to which the invention pertains upon their reading and understanding this specification.

BRIEF DESCRIPTION OF THE DRAWINGS

The invention comprises various steps and arrangements of steps, and various components and arrangements of components, preferred embodiments of which are illustrated in the accompanying drawings that form a part hereof and wherein.

DETAIL DESCRIPTION OF PREFERRED EMBODIMENTS

Figure 1:
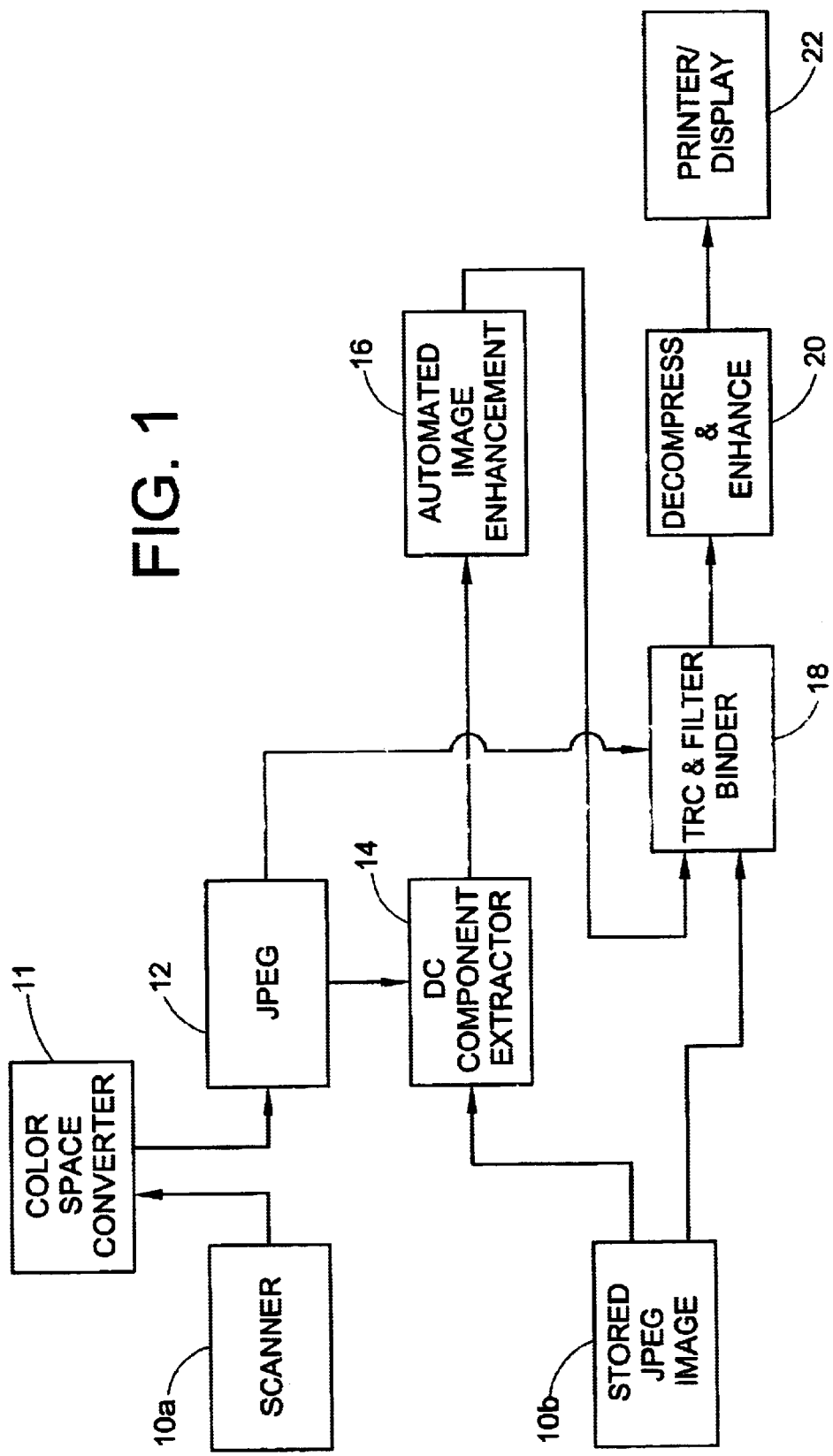
FIG. 1 is a block diagram illustrating image enhancement of JPEG compressed image data in accordance with the present invention.

Referring now to the drawings, wherein the showings are for purposes of illustrating preferred embodiments of the invention only and not for purposes of limiting same, FIG. 1 illustrates an example of an image processing system implementing the present invention. Input image data defining an input image is supplied from either a scanner 10a or memory 10b. In the case where the input image data is supplied from a scanner 10a, the scanner can be a black-and-white or color scanner that scans a printed input image and that derives digital image data that defines the scanned printed image. Typically, the scanner 10a outputs digital image data defined in terms of red, green, and blue (RGB) color separations, although the data can alternatively be supplied in any other suitable color space. A color space converter 11 receives the digital image data from the scanner 10a and, if required, converts the data into a luminance-chrominance color space, such as $YC_bC_r$ color space or the like as is required for JPEG data compression of the input image data. The input image data is output by the color space converter 11 to a JPEG compression unit 12 that compresses the data using a conventional JPEG compression process.

Alternatively, the input image data is supplied from a memory 10b or other conventional source in JPEG compressed format as is well known to minimize memory requirements. In either case, whether the input image data is supplied from the scanner 10a, the memory 10b, or another suitable source, the data can define the input image monochromatically or in terms of multiple color separations that, together, define a color image.

As is described in full detail below, JPEG compressed data includes DC components and, in accordance with the present invention, these DC components are extracted from the JPEG compressed data by a DC component extractor 14 that receives the JPEG compressed data from either the JPEG compression unit 12 or another source such as the memory 10b. The DC components extracted by the DC component extractor 14 are input to the Automated Image Enhancement (AIE) system 16 that is fully described in the aforementioned Eschbach et al. and Fuss et al. patents. The unaltered JPEG compressed image data, including the DC components, is also input from the JPEG compression unit 12 or the memory 10b to a TRC and Filter Binder 18. It should be noted that optionally one may choose to incorporate a modified DC component extractor as described in U.S. Statutory Invention Registration No. H0001684. In such case, a small subset of the low frequency AC components is also decoded in an efficient way. In this case, some of the performance advantages of the pure DC component extraction with respect to processing time are traded off against an increased set of data for the statistical analysis. This trade-off can be advantageous, e.g., for images with a limited number of sampling points. For simplicity of description, it is intended that the terms "DC" and "DC components" used in the following encompass this optional implementation. The above-noted U.S. Statutory Invention Registration No. H0001684, entitled "Fast Preview Processing for JPEG Compressed Images" is hereby expressly incorporated by reference herein.

The AIE system 16, in turn, derives a correction tone reproduction curve TRC and/or filter based upon only the DC components input from the DC component extractor 14. The correction TRC and/or filter are input to the TRC & filter binder 18 wherein the TRC and filter are bound to or otherwise operatively associated with the JPEG compressed image data. Once the correction TRC and/or filter are bound to or otherwise operatively associated with the relevant JPEG compressed image data, the correction TRC and filter are available to any downstream image processing module, and the TRC and filter can be applied once the JPEG compressed image data are decompressed. For example, when the input image is to be viewed by way of an image output terminal 22, such as a printer or visual display, the JPEG compressed data, including the correction TRC and/or filter bound thereto, are input to a decompress and enhance unit 20 wherein: (i) the JPEG compressed data are decompressed in a conventional manner to provide uncompressed input image data; and, (ii) the uncompressed input image data are enhanced via application of the corrective TRC and/or filter. Thereafter, the enhanced, uncompressed input image data are input to the image output terminal for display/printing.

Figure 2:
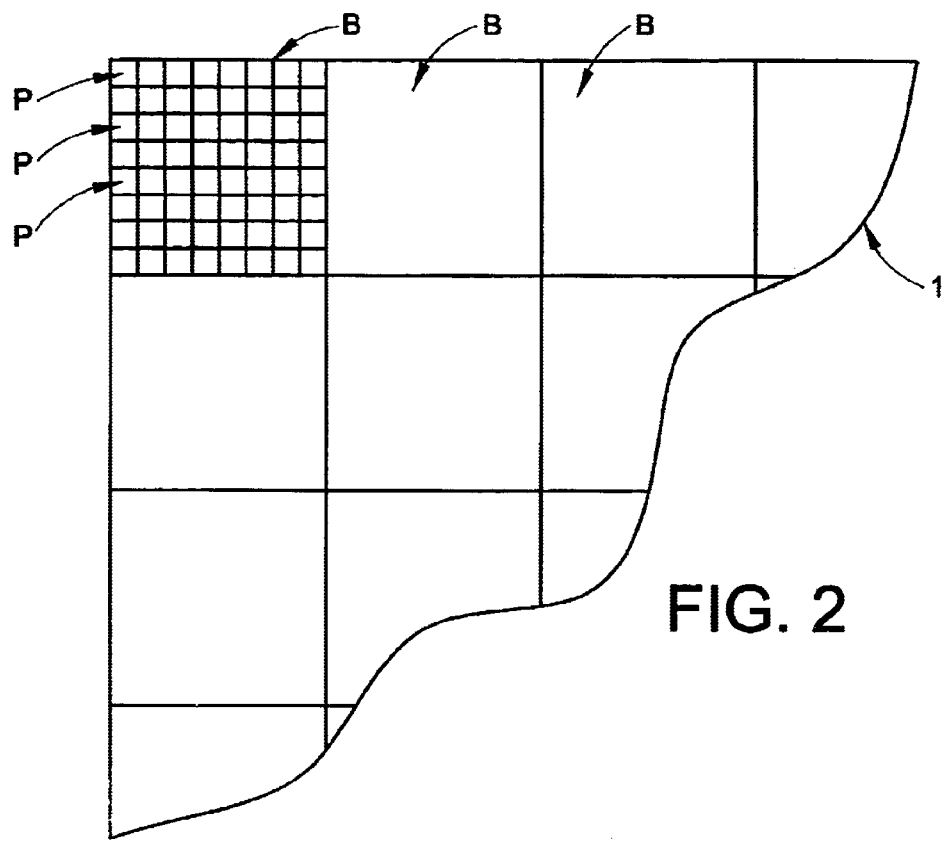
FIG. 2 is a partial illustration of an input digital image to be compressed according to a conventional JPEG data compression operation.

According to the essential properties of JPEG compression, an input image I (FIG. 2) is defined in terms of a plurality of pixels P, each defined in terms of a luminance-chrominance color space such as $YC_bC_r$. This image I to be compressed is divided into a 2-dimensional array of typically square blocks B of pixels P (the individual pixels P in only one of the blocks B are labeled for clarity). Most commonly, the original image I is divided into square blocks with each block comprising 8×8=64 pixels P from the original image I.

A discrete cosine transform (DCT) is then performed on the pixel data P in each block B. The forward DCT has the effect of transforming each of the blocks B into the spatial frequency domain and, following the DCT, the elements in a block B still completely describe the original input image data, but larger values tend to cluster at the top left corner of the block B, in a low spatial frequency region. Simultaneously, the elements located more toward the lower right hand portion of the block B will tend toward zero for most photographic images. The top-left entry 30 in each block B, which represents the average value all pixels P in the block B, is known as the DC component or DC coefficient (identified in FIG. 3 as "DC") of the block B, and all the other entries 32 in the block are referred to as the AC coefficients or AC components (identified in FIG. 3 as "AC") of the block. In the case of color image data, the DC component DC of a block B represents the average luminance-chrominance value of the pixels P defining that block B. Of course, in the case of black-and-white data, the DC component DC of a block B represents only the average luminance of the pixels P defining that block B.

Following the DCT step, individual entries DC,AC in the block B are quantized, or in effect made into smaller numbers, and rounded. Then, the quantized entries are Huffrnan-encoded to yield a string of bits. There may be other lossless compression steps to encode the quantized DCT coefficients, but the final product is inevitably a string of bits for each block B, wherein each block B is converted into a string of bits of a different length. Of course, numerous variations on the above-described JPEG compression technique are well known and may be implemented without departing from the overall scope and intent of the present invention.

Figure 3:
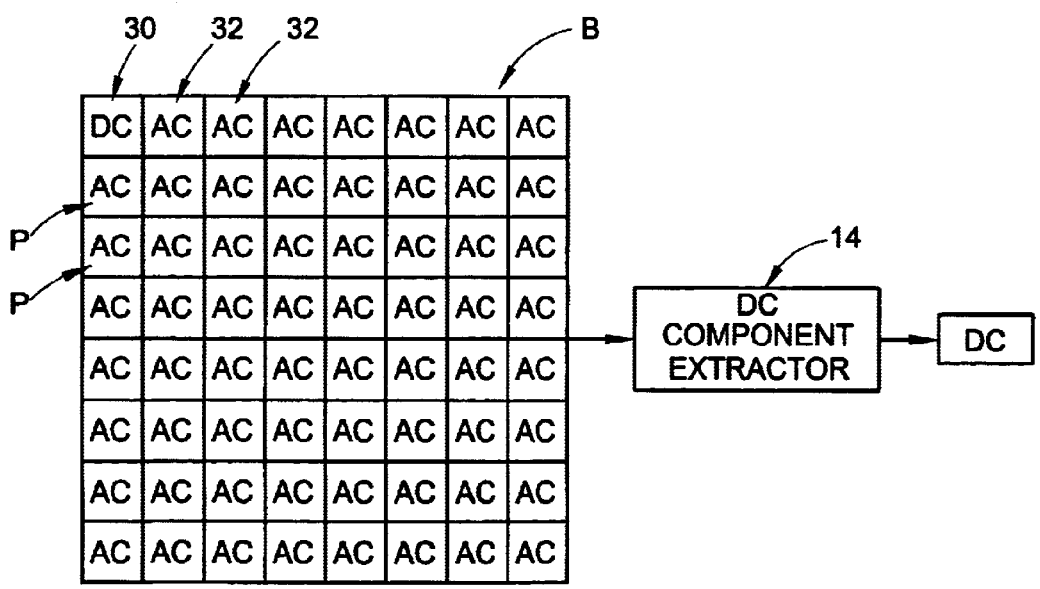
FIG. 3 is a diagrammatic illustration of an 8×8 pixel block of JPEG compressed data, and extraction of the DC component therefrom for purposes of image enhancement in accordance with the present invention; and, FIG. 4 illustrates a image enhancement apparatus and method for enhancement of JPEG compressed data in accordance with the present invention.

FIG. 3 illustrates operation of the DC component extractor 14 as previously described in relation to FIG. 1. In FIG. 3 it may be seen that when a block B of JPEG compressed data is input to the DC component extractor 14, the DC component extractor 14 identifies and outputs the DC component DC of the input block B. As noted, this extracted DC component DC represents the average luminance or the average luminance-chrominance value for the pixels P of a block B.

Figure 4:
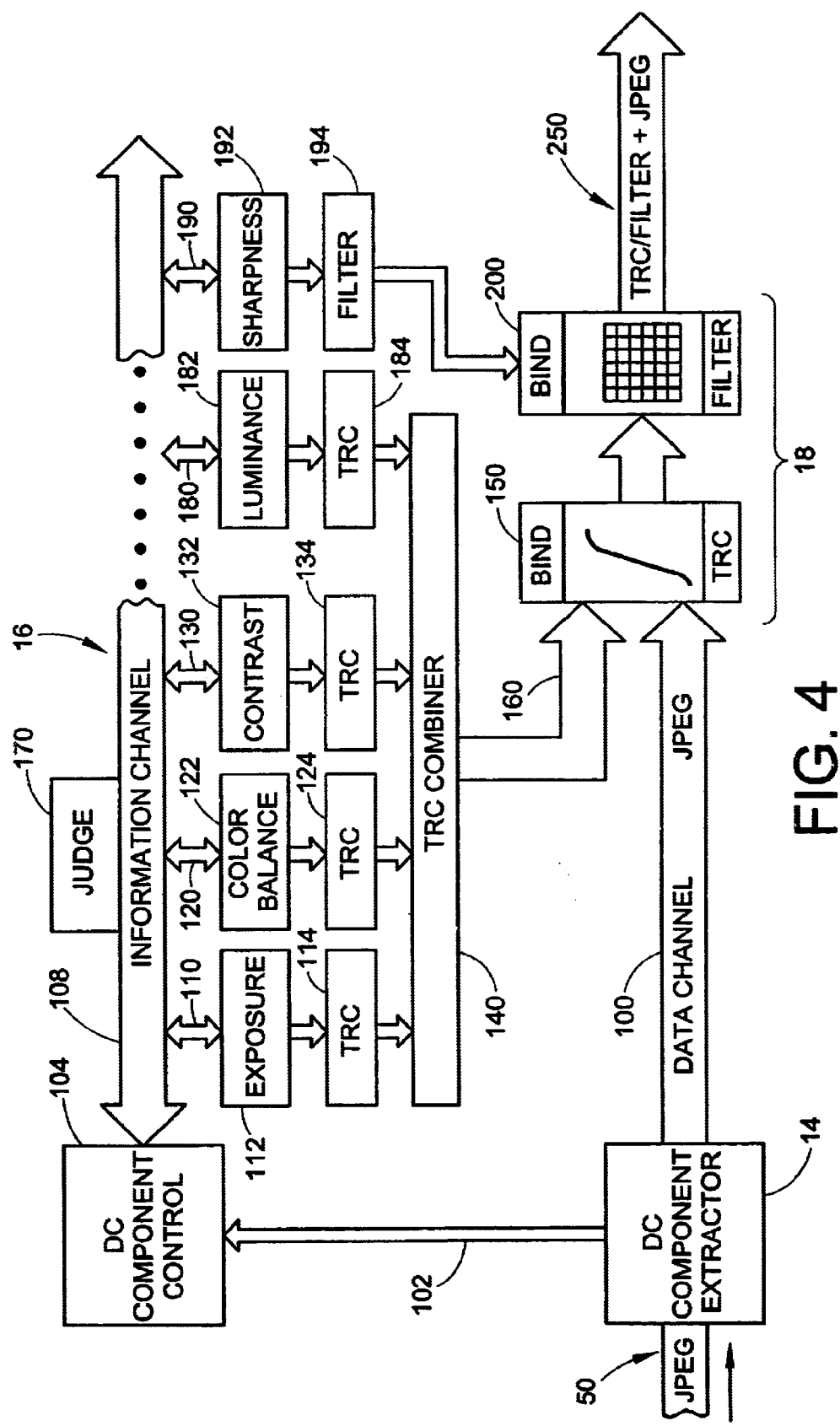

FIG. 4 is a more detailed illustration of an image processing apparatus that is adapted for enhancement of JPEG compressed image data in accordance with the present invention. JPEG compressed image data is received at 50 from a memory 10b, a JPEG compression unit 12, or another source, and the DC component extractor 14 extracts at least some, and preferably all, of the DC components DC from the JPEG compressed data. Those of ordinary skill in the art will recognize that all of the DC components DC need not necessarily be extracted to provide a good subsampling of the JPEG compressed data—only some of the DC components DC are required to obtain a usable statistical sampling of the JPEG compressed image data. The JPEG compressed data stream is unaltered by the DC component extractor 14, and from the DC component extractor 14, it is input to the TRC/Filter binder unit 18 by way of a data channel 100.

The extracted DC components DC are input via data channel 102 to a DC component control module 104 that controls the input of the extracted DC components DC into the automated image enhancement (AIE) unit 16. In particular, the DC component control unit 104 makes the extracted DC components DC available on an information channel 108 that is, in turn, operatively connected to a plurality of AIE modules, e.g., an AIE exposure module 112, an AIE color balance module 122, and AIE contrast module 132, and AIE luminance module 182, and an AIE sharpness module 192, by way of buses 110, 120, 130, 180, 190, respectively. Those of ordinary skill in the art will recognize that other AIE modules can form a part of the AIE unit 16, and it is not intended that the invention be limited to the particular AIE modules shown. The AIE modules can also return information to the information channel 108 for use by other AIE modules. The AIE modules 112, 122, 132, 182, 192, in the AIE unit 16 are described in the aforementioned Eschbach et al. and Fuss et al. U.S. Patents in greater detail.

Each of the exposure, color balance, contrast, and luminance AIE modules 112, 122, 132, 182 use the data supplied on the information channel 108 to calculate the input signals for the respective TRC generators 114, 124, 134, 184 that generate intermediate TRC's required to effect the required image modifications as determined by each module 112, 122, 132, 182. Each of the TRC generators 114, 124, 134, 184, directs a generated intermediate TRC to a TRC combiner 140 that combines the respective intermediate TRC's into a single, final TRC 160 defined by a look-up table (LUT). The final TRC is then directed to the bind TRC unit 150 of the TRC/filter binder 18 wherein it is bound to the JPEG compressed image data for subsequent use. Similarly, a sharpness module 192 receives the DC components DC from the information channel 108 and uses same to generate a sharpness filter 194 that is directed to the TRC/filter binder 18, in particular to a bind filter unit 200 thereof, wherein the filter is bound to the JPEG compressed data (along with any TRC that has already been bound to the JPEG compressed data by the bind TRC unit 150. The combined TRC/Filter and JPEG compressed image data is output at 250 to downstream image processing modules such as the decompress/enhance unit 20 and image output terminal 22 described in connection with FIG. 1. It should be recognized by those of ordinary skill in the art that the final TRC 160 and/or sharpness filter 194 can be bound or otherwise operatively associated with the JPEG compressed image data for any desired length of time, including a fraction of a second or months, years, or longer such as for long-term archival storage. Furthermore, the final TRC 160 and/or filter 194 can be used immediately once derived, assuming the JPEG compressed image data has been suitably decompressed.

Those of ordinary skill in the art will recognize that the DC components DC extracted from the JPEG compressed data provide a subsampling of the uncompressed input image data, without requiring that the image data be further decompressed. Thus, the DC components can be used by the AIE systems described above without significant modifications to these systems. On the other hand, it is necessary to keep in mind that the DC components DC, themselves, represent only an average value of the data in each 64 pixel (or other size) block B of the input image I. Therefore, it may be desirable in certain situations to use more conservative parameters in the AIE system 16 to account for the fact that any given pixel P in a block B may vary significantly from the average value DC. Also, as noted above, it is to be recognized that not all the extracted DC components DC need to be input to the AIE system 16. For example, half of the DC components DC may provide a good subsampling of the JPEG compressed data.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments, what is claimed is:

1. A method of processing JPEG compressed image data comprising:
   receiving JPEG compressed image data that represent an input digital image, said JPEG compressed image data including a plurality of DC components;
   extracting a plurality of said DC components from said JPEG compressed image data, said extracted plurality of said DC components representing a subsampling of said input digital image;
   inputting at least some of said plurality of extracted DC components to an automated image enhancement system;
   using said DC components input to said automated image enhancement system to derive at least one of a final correction tone reproduction curve and a sharpness filter for enhancement of said input digital image represented by said JPEG compressed data; and,
   decompressing said JPEG compressed image data to obtain decompressed image data that represent said input digital image; and,
   using said at least one of said final tone reproduction curve and said sharpness filter to enhance said decompressed image data.

2. The method of processing JPEG compressed image data as set forth in claim 1, further comprising, prior to said step of decompressing said JPEG compressed image data, the step of:
   at least temporarily storing said at least one of said final tone reproduction curve and said sharpness filter for subsequent use in enhancing said input digital image represented by said JPEG compressed image data.

3. The method of processing JPEG compressed image data as set forth in claim 1, wherein said step of inputting at least some of said plurality of extracted DC components to an automated image enhancement system comprises inputting at least some of said plurality of DC components to at least one of an exposure enhancement module, a color balance enhancement module, a contrast enhancement module, and a luminance enhancement module, said at least one module receiving and deriving a respective intermediate correction tone reproduction curve based upon at least said input DC components, wherein said step of deriving at least one of a final correction tone reproduction curve and a sharpness filter comprises inputting each respective intermediate tone reproduction curve to a tone reproduction curve combiner and combining all of said respective intermediate tone reproduction curves to define said final correction tone reproduction curve.

4. The method of processing JPEG compressed image data as set forth in claim 2, wherein said step of at least temporarily storing said at least one of said final correction tone reproduction curve and said sharpness filter for subsequent use comprises binding said at least one of said final correction tone reproduction curve and sharpness filter to said received JPEG compressed image data.

5. The method of processing JPEG compressed image data as set forth in claim 3, wherein said step of inputting at least some of said plurality of extracted DC components to an automated image enhancement system further comprises inputting at least some of said plurality of extracted DC components to a sharpness enhancement module that derives a sharpness filter based upon said at least some input DC components.

6. The method of processing JPEG compressed image data as set forth in claim 1 wherein said step of inputting at least some of said plurality of extracted DC components to an automated image enhancement system comprises inputting all of said plurality of extracted DC components to said automated image enhancement system.

7. An apparatus for processing JPEG compressed image data, said apparatus comprising:
  means for receiving JPEG compressed image data that represent an input digital image, said JPEG compressed image data including a plurality of DC components;
  a DC component extractor adapted for extracting a plurality of said DC components from said JPEG compressed image data, said extracted plurality of said DC components representing a subsampling of said input digital image;
  an automated image enhancement system adapted for receiving at least some of said DC components extracted by said DC component extractor and for using said DC components input to said automated image enhancement system to derive at least one of a final correction tone reproduction curve and a sharpness filter for enhancement of said input digital image represented by said JPEG compressed data;
  means for decompressing said JPEG compressed data to provide uncompressed image data that represent said input digital image; and,
  means for using said at least one of said final tone reproduction curve and said sharpness filter to enhance said uncompressed image data provided by said decompressing means.

8. The apparatus for processing JPEG compressed image data as set forth in claim 7, further comprising:
  means for at least temporarily storing said at least one of said final correction tone reproduction curve and said sharpness filter for subsequent use in enhancing said input digital image represented by said JPEG compressed image data after decompression of said JPEG compressed image data.

9. The apparatus for processing JPEG compressed image data as set forth in claim 7, wherein said automated image enhancement system comprises:
  at least one of an exposure enhancement module, a color balance enhancement module, a contrast enhancement module, and a luminance-enhancement module, said at least one module receiving and deriving a respective intermediate correction tone reproduction curve based upon at least said input DC components; and,
  a tone reproduction curve combiner adapted for combining all of said respective intermediate tone reproduction curves into said final correction tone reproduction curve.

10. The apparatus for processing JPEG compressed image data as set forth in claim 8, wherein said means for at least temporarily storing said at least one of said final correction tone reproduction curve and said sharpness filter for subsequent use comprises a binder unit adapted for operatively associating said at least one of said final correction tone reproduction curve and sharpness filter with said received JPEG compressed image data.

11. The apparatus for processing JPEG compressed image data as set forth in claim 9, wherein said automated image enhancement system further comprises a sharpness enhancement module that derives a sharpness filter based upon said at least some input DC components.

12. The apparatus for processing JPEG compressed image data as set forth in claim 7 wherein said automated image enhancement system receives all of said plurality of extracted DC components.

13. In an automated image enhancement system, a method of subsampling JPEG compressed image data, said method comprising:
  receiving blocks of JPEG compressed image data, each of said blocks of JPEG compressed image data representing a plurality of pixels of an input digital image and including a DC component that represents an average pixel value for said plurality of pixels represented by said block of JPEG compressed data;
  without altering said JPEG compressed data, extracting said DC components from at least some of said blocks of JPEG compressed data;
  inputting at least some of said extracted DC components to an automated image enhancement system; and,
  using said DC components input to said automated image enhancement system to generate at least one of a correction tone reproduction curve and a sharpness filter that are to be applied to said input digital image represented by said JPEG compressed data after said JPEG compressed data are decompressed.

14. The method of subsampling JPEG compressed image data as set forth in claim 13, wherein said JPEG compressed image data are color image data expressed in terms of a luminance-chrominance color space whereby said DC component of each block of JPEG compressed data represents an average luminance-chrominance value for said plurality of pixels represented by said block of JPEG compressed data.

15. The method of subsampling JPEG compressed image data as set forth in claim 13, wherein said JPEG compressed image data are monochromatic image data whereby said DC component of each block of JPEG compressed data represents an average luminance value for said plurality of pixels represented by said block of JPEG compressed data.

* * * * *